United States Patent
Lacko

(10) Patent No.: US 10,954,888 B2
(45) Date of Patent: Mar. 23, 2021

(54) HYBRID PIVOT DOOR THRUST REVERSERS

(71) Applicant: ROHR, INC., Chula Vista, CA (US)

(72) Inventor: Anthony Lacko, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 313 days.

(21) Appl. No.: 15/941,357

(22) Filed: Mar. 30, 2018

(65) Prior Publication Data
US 2019/0301399 A1    Oct. 3, 2019

(51) Int. Cl.
| | |
|---|---|
| *F02K 1/60* | (2006.01) |
| *F02K 1/70* | (2006.01) |
| *F02K 1/54* | (2006.01) |
| *F02K 1/62* | (2006.01) |

(52) U.S. Cl.
CPC ............. *F02K 1/60* (2013.01); *F02K 1/54* (2013.01); *F02K 1/70* (2013.01); *F02K 1/62* (2013.01); *F05D 2240/128* (2013.01)

(58) Field of Classification Search
CPC ... F02K 1/60; F02K 1/605; F02K 1/62; F02K 1/625; F02K 1/70; F02K 1/72
See application file for complete search history.

(56) References Cited

U.S. PATENT DOCUMENTS

| | | | | |
|---|---|---|---|---|
| 5,097,661 A | * | 3/1992 | Lair | .......................... F02K 1/60 239/265.39 |
| 5,176,340 A | * | 1/1993 | Lair | ....................... F02K 1/605 239/265.19 |
| 8,052,085 B2 | | 11/2011 | Lair | |
| 8,052,086 B2 | | 11/2011 | Lair | |
| 2008/0072570 A1 | * | 3/2008 | Lair | .......................... F02K 1/60 60/226.2 |
| 2009/0126339 A1 | * | 5/2009 | Lair | .......................... F02K 1/60 60/226.2 |
| 2016/0215728 A1 | * | 7/2016 | Kernemp | ................... F02K 1/48 |
| 2017/0191447 A1 | | 7/2017 | Osman | |
| 2019/0162135 A1 | * | 5/2019 | Channell | ................ F02K 1/625 |

FOREIGN PATENT DOCUMENTS

| | | |
|---|---|---|
| EP | 1903205 | 3/2008 |
| EP | 2060768 | 5/2009 |

OTHER PUBLICATIONS

European Patent Office, European Search Report dated Aug. 27, 2019 19165868.1.

* cited by examiner

*Primary Examiner* — Andrew H Nguyen
(74) *Attorney, Agent, or Firm* — Snell & Wilmer L.L.P.

(57) ABSTRACT

A thrust reverser is disclosed. The thrust reverser includes a frame, a first reverser door pivotally mounted to the frame, a second reverser door pivotally mounted to the frame and a hybrid exhaust duct. A first trailing edge of the first reverser door forms a portion of an exit plane of the thrust reverser and a second trailing edge of the second reverser door merges into the hybrid exhaust duct.

15 Claims, 3 Drawing Sheets

HYBRID PIVOT DOOR THRUST REVERSERS

FIELD

The present disclosure relates generally to aircraft thrust reversers used with gas turbine engines and, more particularly, to hybrid pivot door thrust reversers having both pre-exit and post-exit characteristics.

BACKGROUND

Turbofan gas turbine engines are known to include a fan section that produces a bypass airflow for providing the majority of engine propulsion and a core engine section through which a core airflow is compressed, mixed with fuel, combusted and expanded through a turbine to drive the fan section. In a mixed flow turbofan engine, the cool bypass airflow is ducted between a surrounding nacelle and an outer casing of the core engine section and mixed with a hot exhaust stream from the core engine section prior to discharge from the engine nozzle in a combined or mixed exhaust stream. The surrounding nacelle may include a thrust reverser capable of redirecting the mixed exhaust stream from a rearward direction to, at least partially, a forward direction thus producing a rearward thrust that may serve to decelerate forward motion of an aircraft and thereby assist braking the aircraft upon landing. Pivot door thrust reversers may be used with turbofan gas turbine engines for aircraft, including for corporate or business jets. Pre-exit pivot door thrust reversers may generally be characterized as including thrust reverser doors having trailing edges positioned forward of the exit plane of an exhaust duct, while post-exit pivot door thrust reversers may generally be characterized as including thrust reverser doors having trailing edges that form at least a portion of the exit plane of an exhaust duct.

SUMMARY

A thrust reverser is disclosed. In various embodiments, the thrust reverser includes a frame, a first reverser door pivotally mounted to the frame and having a first trailing edge, a second reverser door pivotally mounted to the frame and having a second trailing edge and a hybrid exhaust duct, where the first trailing edge provides a portion of an exit plane of the thrust reverser and the second trailing edge provides a transition portion that merges into the hybrid exhaust duct.

In various embodiments, the thrust reverser defines a central axis and the hybrid exhaust duct includes a pre-exit portion that extends circumferentially about the central axis from a first termination point to a second termination point. In various embodiments, the first termination point and the second termination point define a post-exit portion of the hybrid exhaust duct and wherein the first reverser door includes a first outer surface having a first outer surface portion configured to reside in the post-exit portion when the thrust reverser assumes a stowed position. In various embodiments, the thrust reverser includes an attachment flange, the first outer surface defines a first length from the attachment flange to the exit plane, the second reverser door includes a second outer surface that defines a second length from the attachment flange to the pre-exit portion of the hybrid exhaust duct and the first length is greater than the second length.

In various embodiments, the pre-exit portion of the hybrid exhaust duct includes a third outer surface opposite the first outer surface, the third outer surface has a third length and a sum of the second length and the third length is equal to the first length. In various embodiments, the post-exit portion of the hybrid exhaust duct defines an angular section having an origin positioned on the central axis A and the angular section defines an arc within a range from about one-hundred-twenty degrees (120°) to about sixty degrees (60°). In various embodiments, the second length is equal to about eighty percent (80%) to about ninety percent (90%) of the first length.

In various embodiments, the first reverser door is pivotally mounted to the frame on a first hinge line, the second reverser door is pivotally mounted to the frame on a second hinge line and the first hinge line is located aft of the second hinge line. In various embodiments, the first hinge line is oriented substantially perpendicular to the central axis and spaced a first offset distance from the central axis, the second hinge line is oriented substantially perpendicular to the central axis and spaced a second offset distance from the central axis and the first offset distance is less than or equal to the second offset distance. In various embodiments, the first reverser door defines a length along an outer surface of the first reverser door, from an attachment flange of the thrust reverser to the exit plane, the first offset distance is equal about 5% to about 15% of the length and the second offset distance is equal to about 5% to about 15% of the length.

A hybrid thrust reverser is disclosed. In various embodiments, the hybrid thrust reverser includes a frame, a first reverser door pivotally mounted to the frame, a second reverser door pivotally mounted to the frame and a hybrid exhaust duct. A first trailing edge of the first reverser door forms a post-exit portion of the thrust reverser and a second trailing edge of the second reverser door forms a pre-exit portion of the thrust reverser.

In various embodiments, the post-exit portion of the thrust reverser includes an open portion defined by an angular section having an origin positioned on a central axis A extending through the thrust reverser and the angular section defines an arc within a range from about one-hundred-twenty degrees (120°) to about sixty degrees (60°). In various embodiments, the pre-exit portion of the thrust reverser includes a circumferential portion of the hybrid exhaust duct that merges with the second reverser door when the thrust reverser assumes a stowed position. In various embodiments, the first reverser door is pivotally mounted to the frame on a first hinge line, the second reverser door is pivotally mounted to the frame on a second hinge line and the first hinge line is located aft of the second hinge line. In various embodiments, the first hinge line is oriented substantially perpendicular to the central axis and spaced a first offset distance from the central axis, the second hinge line is oriented substantially perpendicular to the central axis and spaced a second offset distance from the central axis and the first offset distance is less than or equal to the second offset distance.

A thrust reverser is disclosed. In various embodiments, the thrust reverser includes a pair of opposing side beams; an upper reverser door pivotally mounted to the pair of opposing side beams and having an upper trailing edge; a lower reverser door pivotally mounted to the pair of opposing side beams and having a lower trailing edge; and a hybrid exhaust duct. In various embodiments, the upper trailing edge provides a portion of an exit plane of the thrust reverser and the lower trailing edge provides a transition portion that merges into the hybrid exhaust duct.

In various embodiments, the upper reverser door is pivotally mounted to the pair of opposing side beams on a first hinge line, the lower reverser door is pivotally mounted to the pair of opposing side beams on a second hinge line and the first hinge line is located aft of the second hinge line. In various embodiments, the thrust reverser defines a central axis, the first hinge line is oriented substantially perpendicular to the central axis and spaced a first offset distance from the central axis, the second hinge line is oriented substantially perpendicular to the central axis and spaced a second offset distance from the central axis and the first offset distance is equal to the second offset distance.

In various embodiments, the hybrid exhaust duct includes a pre-exit portion that extends circumferentially about the central axis from a first termination point to a second termination point. In various embodiments, the first termination point and the second termination point define a post-exit portion of the hybrid exhaust duct and the upper reverser door includes an upper outer surface having a first outer surface portion configured to reside in the post-exit portion when the thrust reverser assumes a stowed position.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1:
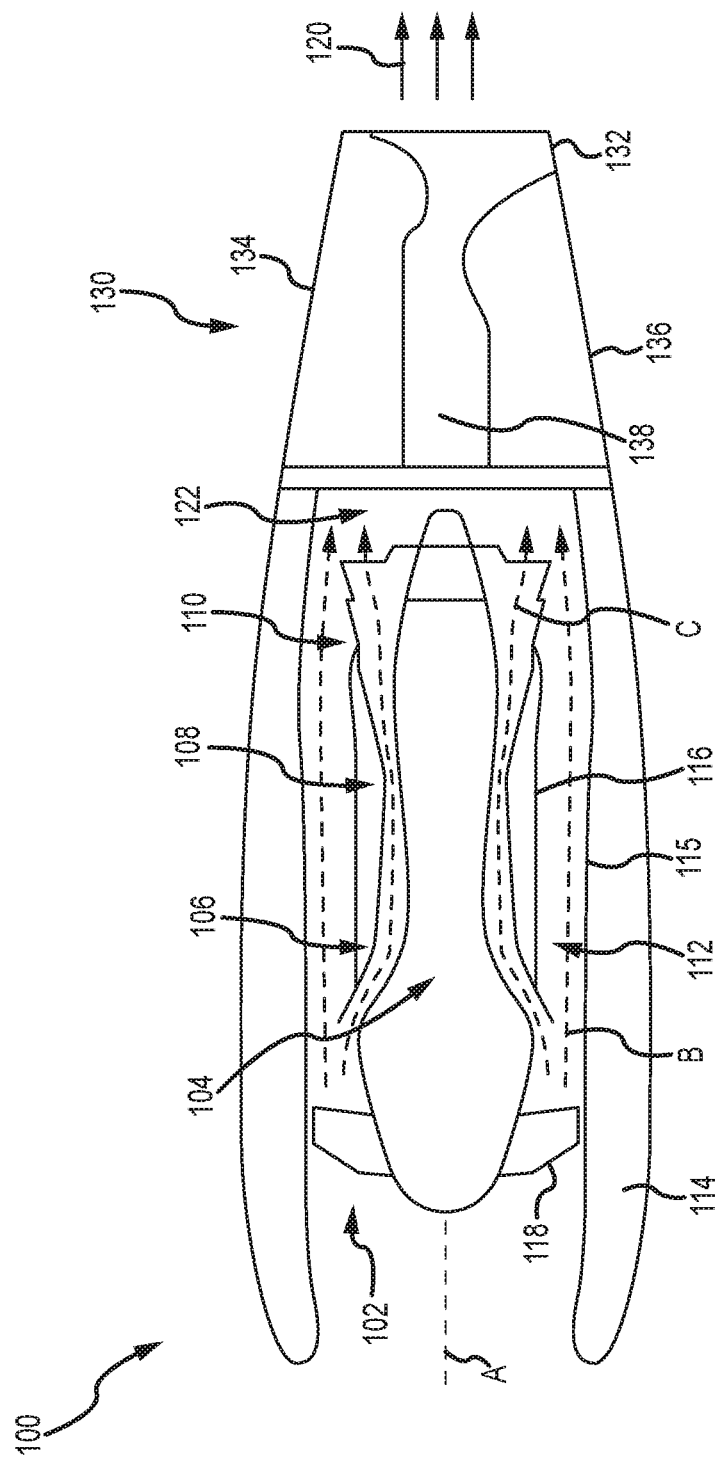
FIG. 1 provides a schematic view of a gas turbine engine, in accordance with various embodiments.

Referring now to the drawings, FIG. 1 schematically illustrates a gas turbine engine 100 of a mixed flow turbofan variety. The gas turbine engine 100 generally includes a fan section 102 and a core engine section 104, which includes a compressor section 106, a combustor section 108 and a turbine section 110. The fan section 102 drives air along a bypass flow path B in a bypass duct 112 defined within a radially inner surface 115 of a nacelle 114 and an outer casing 116 of the core engine section 104, while the compressor section 106 drives air along a core flow path C of the core engine section 104 for compression and communication into the combustor section 108 and then expansion through the turbine section 110.

The core engine section 104 may generally include a low speed spool and a high speed spool mounted for rotation about a central longitudinal axis A. The low speed spool generally includes an inner shaft that interconnects a fan 118 within the fan section 102, a low pressure compressor within the compressor section 106 and a low pressure turbine within the turbine section 110. The inner shaft may be connected to the fan 118 through a speed change mechanism or gear box to drive the fan 118 at a lower rotational speed than the rotational speed of the low speed spool. The high speed spool generally includes an outer shaft that interconnects a high pressure compressor within the compressor section 106 and a high pressure turbine within the turbine section 110. A combustor is arranged in the combustor section 108 between the high pressure compressor and the high pressure turbine. The air passing through the bypass flow path B mixes with the combustion gases exiting the core flow path C in a mixing section 122 positioned downstream of the core engine section 104 prior to discharge as a mixed exhaust stream 120, which provides the thrust achieved by the gas turbine engine 100.

A thrust reverser 130 is mounted to the aft end of the gas turbine engine 100. The thrust reverser 130 includes a generally annular exhaust duct 132, which defines an outer boundary for discharging the mixed exhaust stream 120 when the thrust reverser 130 assumes a closed, stowed or retracted position, as illustrated in FIG. 1. The thrust reverser 130 further includes an upper reverser door 134, a lower reverser door 136 and a pair of opposing side beams 138, which may house actuator componentry and connecting members used to open and close the upper reverser door 134 and the lower reverser door 136. As discussed below, thrust reversal is affected by opening the upper reverser door 134 and the lower reverser door 136 to direct all or a portion of the mixed exhaust stream 120 in a direction having an upstream component relative to the central longitudinal axis A of the gas turbine engine 100. The momentum of the upstream component of the mixed exhaust stream 120 exiting the thrust reverser 130 while in an open or deployed position provides the reverse thrust used to decelerate an aircraft upon landing or during a rejected takeoff.

Figure 2A:
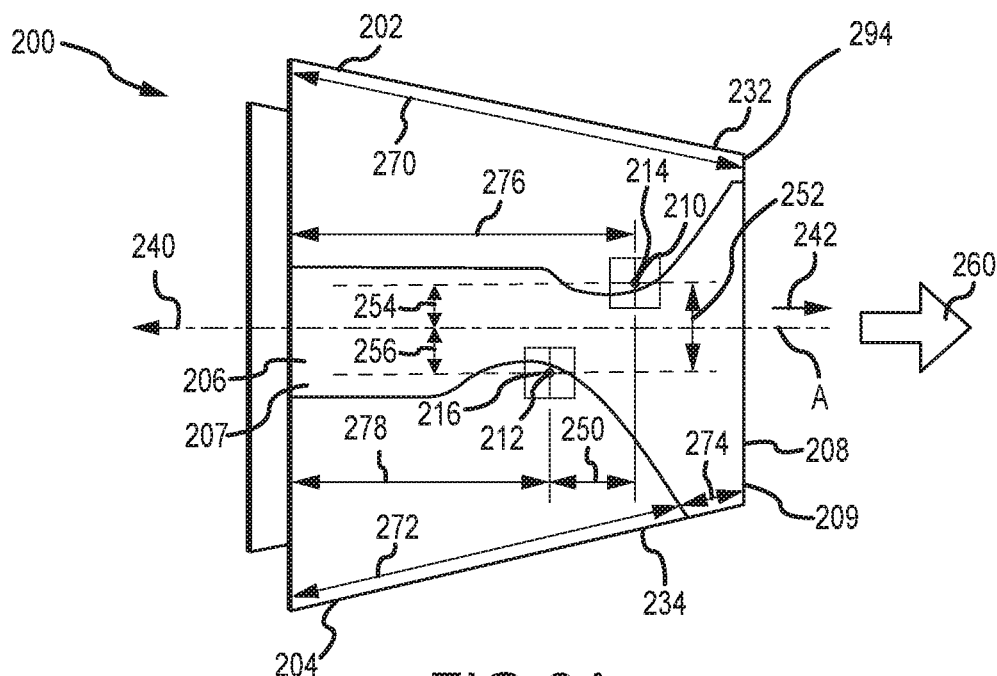
FIGS. 2A and 2B provide schematic views of a thrust reverser in a stowed position and a deployed position, respectively, in accordance with various embodiments.
Figure 2B:
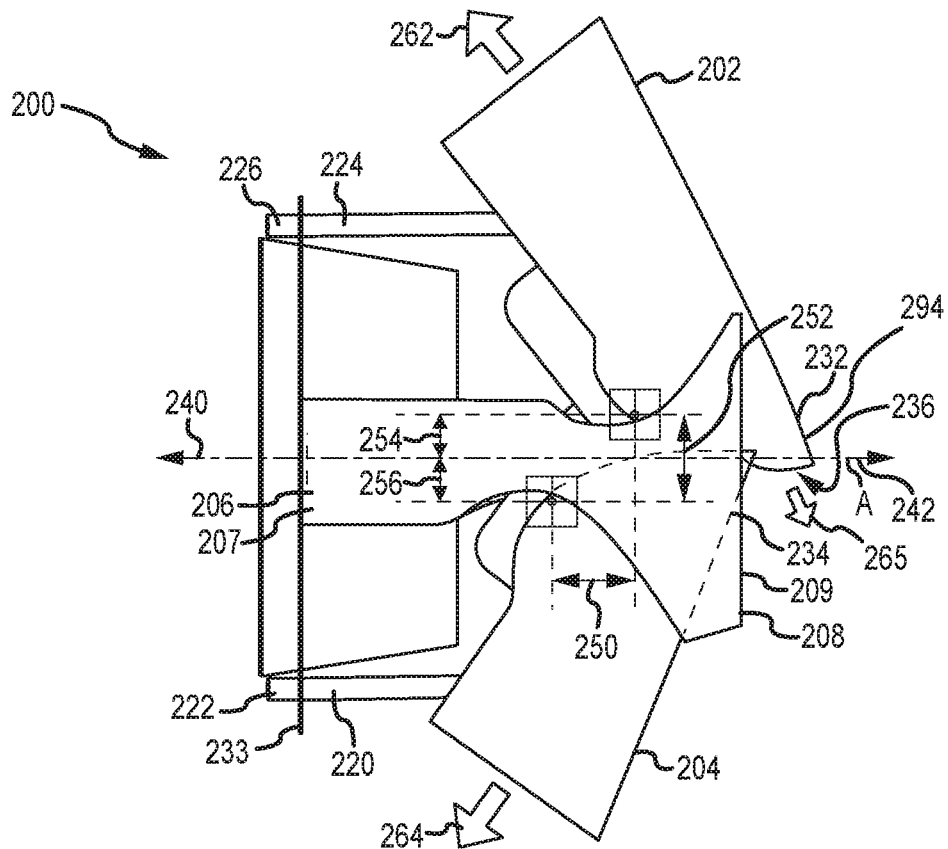

Referring now to FIGS. 2A and 2B, schematic side views of a thrust reverser 200 in a stowed position and a deployed position, respectively, are illustrated, in accordance with various embodiments. The thrust reverser 200 includes an upper reverser door 202, a lower reverser door 204, a pair of opposing side beams 206 (only one is shown) and a hybrid exhaust duct 208 (described more fully below). In various embodiments, the pair of opposing side beams 206 comprises a port side beam 207 and a starboard side beam (hidden). The pair of opposing side beams 206 provides a frame or structural support for mounting related components and operating the thrust reverser 200 between deployed and retracted positions. For example, an upper pivot assembly 210, characterized by an upper hinge line 211 (shown in FIGS. 2C and 2D), includes components mounted to the opposing side beams 206 and is configured to facilitate rotation of the upper reverser door 202 between open or deployed and closed or stowed states within the thrust reverser 200. Similarly, a lower pivot assembly 212, characterized by a lower hinge line 213 (shown in FIGS. 2C and 2D), includes components mounted to the opposing side beams 206 and is configured to facilitate rotation of the lower reverser door 204 between deployed and stowed states within the thrust reverser 200. In various embodiments, an upper port pivot assembly 214 is mounted to an upper portion of the port side beam 207 and a lower port pivot assembly 216 is mounted to a lower portion of the port side beam 207. In various embodiments, an upper starboard pivot assembly (hidden) is mounted to an upper portion of the starboard side beam (hidden) and a lower starboard pivot assembly (hidden) is mounted to a lower portion of the starboard side beam (hidden). In various embodiments, the starboard side pivot assembly and side beam configuration described above are symmetrical with the port side pivot assembly and side beam configuration described above. In various embodiments, a first actuator 220 may have a first end 222 connected to an attachment flange 233 and a second end (hidden) connected to an inner surface of the lower reverser door 204. Similarly, a second actuator 224 may have a first end 226 connected to the attachment flange 233 and a second end (hidden) connected to an inner surface of the upper reverser door 202. In various embodiments, as illustrated in FIGS. 2A and 2B and as described above, each one of the pair of opposing side beams 206 extend, generally, in a rearward direction, from the attachment flange 233 to locations where the lower pivot assemblies (e.g., lower port pivot assembly 216) and the upper pivot assemblies (e.g., the upper port pivot assembly 214) connect to the pair of opposing side beams 206. In various embodiments, the hybrid exhaust duct 208 also extends from the attachment flange 233, exterior to the pair of opposing side beams 206, and is secured to the thrust reverser 200 by attachment to the pair of opposing side beams 206. In various embodiments, the hybrid exhaust duct 208 and the pair of opposing side beams 206 form a unitary or monolithic structure configured for attachment to the attachment flange 233.

When the thrust reverser 200 assumes the closed or stowed position, e.g., during flight, the upper reverser door 202 and the lower reverser door 204 are rotated to their closed positions (see FIG. 2A). The outer surfaces of the upper reverser door 202 and the lower reverser door 204 blend with the outer surface of the nacelle, forming a smooth aerodynamic shape of the gas turbine engine. In the same stowed configuration, a mixed gas stream 260 exits the hybrid exhaust duct 208 and is generally unaffected by the thrust reverser 200 or its componentry, as the inner surfaces of the upper reverser door 202 and the lower reverser door 204 are blended with the interior surface of the hybrid exhaust duct 208 to provide a generally smooth and annular exhaust flow path from downstream of the core engine exhaust to a downstream exit plane or aft end 209 of the thrust reverser 200. While in the stowed position, the mixed gas stream 260 flows out the hybrid exhaust duct 208, providing forward thrust necessary to fly the aircraft. When the thrust reverser 200 assumes the open or deployed position, e.g., upon landing, the upper reverser door 202 and the lower reverser door 204 are rotated to their open positions (see FIG. 2B). The mixed gas stream 260 is diverted from the exit of the hybrid exhaust duct 208 to form an upward stream 262, following an inner surface of the upper reverser door 202 and a downward stream 264, following an inner surface of the lower reverser door 204. Both the upward stream 262 and the downward stream 264 have forward vector components of thrust, which provide the reverse thrust acting on the aircraft.

A central axis A is illustrated extending through the thrust reverser 200. The central axis A may define a fore end or fore direction 240 of the thrust reverser 200 and an aft end or aft direction 242 of the thrust reverser 200. Various embodiments of the disclosure may be described in relation to the central axis A. For example, the upper reverser door 202 may be considered positioned above the central axis A while the lower reverser door 204 may be considered positioned below the central axis A. Similarly, the port side beam 207 may be considered positioned to the port or left side of the central axis A (looking in the fore direction 240) while the starboard side beam may be considered positioned to the right or starboard side of the central axis A (looking in the fore direction 240). More generally, reference to a first reverser door may broadly refer to a reverser door positioned opposite a second reverser door with respect to the central axis A, there being no preferred up or down or side to side orientation, while reference to a first side beam may broadly refer to a side beam positioned opposite a second side beam with respect to the central axis A. As used herein, a first component positioned opposite a second component does not imply the second component is a mirror image of the first component or the second component is positioned symmetrically opposite to the first component, though the disclosure contemplates such mirror image and symmetric configurations and positioning. Additionally, in various embodiments, the downstream exit plane or aft end 209 of the thrust reverser 200 is oriented substantially perpendicular to the central axis A.

Still referring to FIGS. 2A and 2B, when the thrust reverser 200 assumes the deployed state, as shown in FIG. 2B, an upper trailing edge 232 of the upper reverser door 202 is positioned and configured to extend aft of a lower trailing edge 234 of the lower reverser door 204. At the same time, the lower trailing edge 234 of the lower reverser door 204 is positioned and configured to extend further elevated in relation, for example, to the central axis A, than the upper trailing edge 232 of the upper reverser door 202. In other words, the lower trailing edge 234 and the upper trailing edge 232 are positioned relative to one another in the deployed state such that, when viewed along the central axis A, there is minimal to no opening in the axial direction for a leakage component of the exhaust flow to exit the thrust reverser 200 in a direction parallel to the central axis and contribute directly to forward thrust. The resulting configuration may, however, provide a gap 236 between the upper trailing edge 232 and the lower trailing edge 234, and the gap 236 may provide an opening for a spoiled flow 265, but the spoiled flow 265 is directed principally in a vertical direction (or a direction substantially perpendicular to the central axis A), with a minimal vector component in the aft direction, ensuring that the mixed gas stream 260 is diverted almost entirely from exiting the hybrid exhaust duct 208 to form the upward stream 262 and the downward stream 264.

In various embodiments, the size of the gap 236 may be advantageously reduced or minimized by offsetting the centers of rotation of the upper pivot assembly 210 (or upper hinge line 211) and the lower pivot assembly 212 (or lower hinge line 213) by an axial offset distance 250 along the central axis A and a transverse offset distance 252 perpendicular to the central axis. The size of the gap 236 may also be adjusted by incorporating an asymmetry into the length of the upper reverser door 202 relative to the lower reverser door 204. In various embodiments, the upper reverser door 202 has an upper door length 270 and the lower reverser door 204 has a lower door length 272, and the upper door length 270 is greater than the lower door length 272. In various embodiments, the hybrid exhaust duct 208 includes a lower duct length 274. In various embodiments, the lower duct length 274 is sized to correspond with the upper door length 270 and the lower door length 272 such that a radial plane extending through the exit plane or aft end 209 of the thrust reverser 200 is substantially perpendicular to the central axis A. In various embodiments, the sum of the lengths of the lower door length 272 and the lower duct length 274 is about equal to the upper door length 270.

As illustrated in FIGS. 2A and 2B, in various embodiments, the size of the gap 236 is adjusted by both offsetting the centers of rotation of the upper pivot assembly 210 (or upper hinge line 211) and the lower pivot assembly 212 (or lower hinge line 213) by the axial offset distance 250 and the transverse offset distance 252 and by incorporating the asymmetry, described above, into the length of the upper reverser door 202 relative to the lower reverser door 204. In various embodiments, the upper pivot assembly 210 (or upper hinge line 211) is spaced an upper offset distance 254 from the central axis A and the lower pivot assembly 212 (or lower hinge line 213) is spaced a lower offset distance 256 from the central axis A, and in a direction opposite the upper offset distance 254. In various embodiments, the upper offset distance 254 is about equal to the lower offset distance 256. In various embodiments, the upper offset distance 254 is less than or about equal to the lower offset distance 256. In various embodiments, the upper pivot assembly 210 (or upper hinge line 211) is positioned aft of the lower pivot assembly 212 (or lower hinge line 213). In various embodiments, the upper hinge line 211 and the lower hinge line 213 are oriented substantially perpendicular to the central axis A; and, in various embodiments, one or both of the upper hinge line 211 and the lower hinge line 213 are oriented at an angle with respect to the central axis A.

In various embodiments, the upper door length 270 may be defined by a non-dimensional length L. In various embodiments, the lower door length 272 may be defined by a length equal to about 80% to about 90% of L and the lower duct length 274 may be defined by a length equal to about 10% to about 20% of L. In various embodiments, the upper pivot assembly 210 (or upper hinge line 211) may be positioned aft of the attachment flange 233 by a length 276 equal to about 65% to about 75% of L and the lower pivot assembly 212 (or lower hinge line 213) may be positioned aft of the attachment flange 233 by a length 278 equal to about 50% to about 65% of L. In various embodiments, both the upper offset distance 254 and the lower offset distance 256 have a length equal to about 5% to about 15% of L. In various embodiments, the upper offset distance 254 has a length equal to about 5% to about 15% of L and the lower offset distance 256 has a length equal to about 15% to about 25% of L.

Figure 2C:
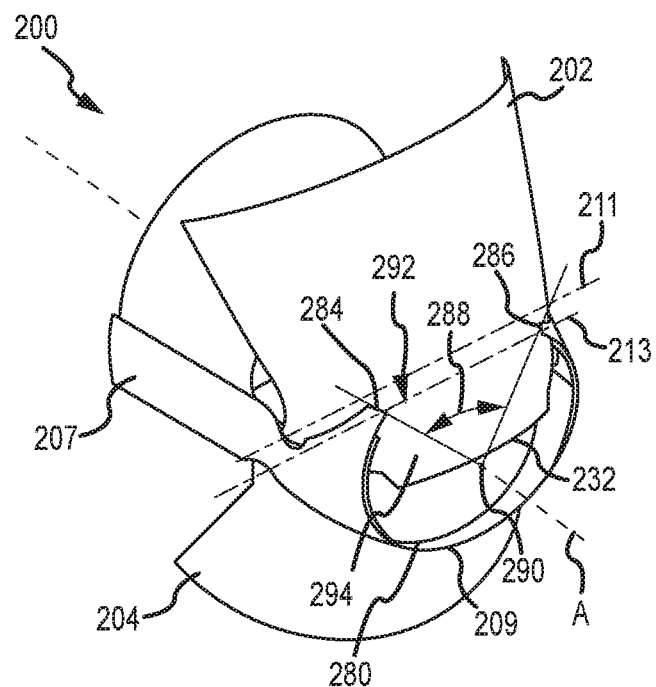
FIGS. 2C and 2D provide schematic perspective views of the thrust reverser depicted in FIGS. 2A and 2B in a deployed position, in accordance with various embodiments.
Figure 2D:
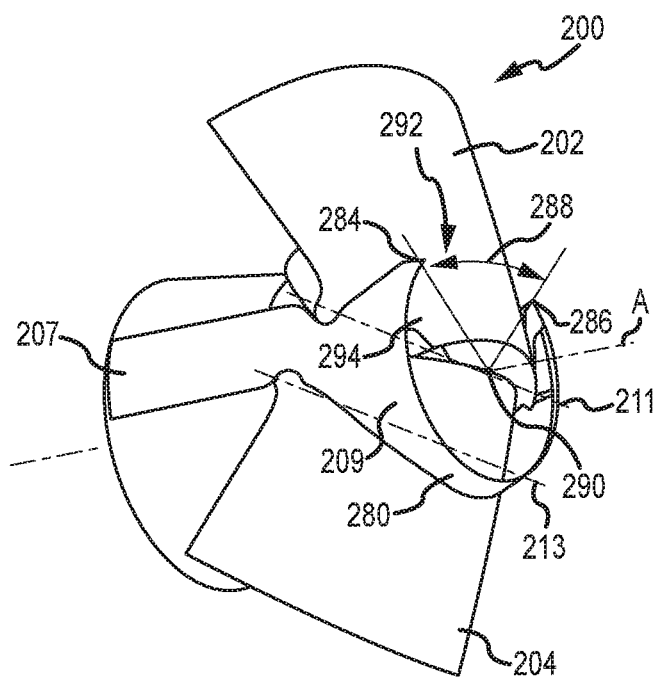

In various embodiments, the hybrid exhaust duct 208 defines a hybrid shape that includes characteristics from both pre-exit and post-exit thrust reversers. Pre-exit type thrust reversers, for example, may be characterized as having the reverser doors and, more particularly, the trailing edges of the reverser doors, located upstream of the nozzle exit plane while in the fully deployed position. In contrast, post-exit type thrust reversers may be characterized as having the reverser doors and, more particularly, the trailing edges of the reverser doors, located downstream of the nozzle exit plane while in the fully deployed position. In various embodiments, the trailing edges of post-exit reverser doors form at least a portion, if not the entirety, of the nozzle exit plane (or the discharge end of the nozzle or exhaust duct). Referring to FIGS. 2C and 2D, for example, the upper trailing edge 232 of the upper reverser door 202 forms a portion of the exit plane or aft end 209 of the thrust reverser 200. The upper reverser door 202 thus includes characteristics of a post-exit thrust reverser. On the other hand, the lower trailing edge 234 of the lower reverser door 204 merges into the hybrid exhaust duct 208 and is positioned forward of the exit plane or aft end 209, and thus includes characteristics of a pre-exit thrust reverser.

In various embodiments, the hybrid pre-exit and post-exit characteristics of the thrust reverser 200 are realized through integration of the hybrid exhaust duct 208 into the thrust reverser 200. As illustrated in FIGS. 2C and 2D, the hybrid exhaust duct 208 includes a lower or pre-exit portion 280 that extends in circumferential fashion about the central axis A. In various embodiments, the hybrid exhaust duct 208 terminates, however, at a first termination point 284 on a port side of the circumferential axis A and at a second termination point 286 on a starboard side of the circumferential axis A. In various embodiments, the first termination point 284 and the second termination point 286 provide an open section or post-exit portion 292 of the hybrid exhaust duct 208, typical of a post-exit thrust reverser. In various embodiments, the locations of the first termination point 284 and the second termination point 286 may be defined by an angular section 288 having its origin 290 positioned on the central axis A. In various embodiments, the angular section defines an arc within a range from about one-hundred-fifty degrees (150°) to about thirty degrees (30°); in various embodiments, the angular section defines an arc within a range from about one-hundred-twenty degrees (120°) to about sixty degrees (60°); and in various embodiments, the angular section defines an arc about ninety degrees (90°). In various embodiments, the upper reverser door 202 includes an upper outer surface (or first outer surface) extending along the upper door length 270, from the attachment flange 233 to the exit plane or aft end 209, and having a first outer surface portion 294 configured to reside within the post-exit portion 292 when the thrust reverser 200 assumes a stowed position. In various embodiments, the lower reverser door 204 includes a lower outer surface (or second outer surface) extending along the lower door length 272, from the attachment flange 233 to the pre-exit portion 280. In various embodiments, the pre-exit portion 280 defines a third outer surface that is opposite the first outer surface portion 294 of the upper reverser door 202. In various embodiments, the lower or second outer surface provides a transition portion or trailing edge configured to merge with the pre-exit portion 280 when the thrust reverser 200 assumes a stowed position.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A thrust reverser, comprising:
a frame;
a first reverser door pivotally mounted to the frame and having a first trailing edge;
a second reverser door pivotally mounted to the frame and having a second trailing edge;
an attachment flange connected to the frame; and
a hybrid exhaust duct,
wherein the first trailing edge provides a portion of an exit plane of the thrust reverser and the second trailing edge provides a transition portion that merges into the hybrid exhaust duct,
wherein the thrust reverser defines a central axis and the hybrid exhaust duct includes a pre-exit portion that extends circumferentially about the central axis from a first termination point to a second termination point,
wherein the first termination point and the second termination point define a post-exit portion of the hybrid exhaust duct and wherein the first reverser door includes a first outer surface having a first outer surface portion configured to reside in the post-exit portion when the thrust reverser assumes a stowed position, and
wherein the first outer surface defines a first length from the attachment flange to the exit plane, wherein the second reverser door includes a second outer surface that defines a second length from the attachment flange to the pre-exit portion of the hybrid exhaust duct and wherein the first length is greater than the second length.

2. The thrust reverser of claim 1, wherein the pre-exit portion of the hybrid exhaust duct includes a third outer surface opposite the first outer surface, wherein the third outer surface has a third length and wherein a sum of the second length and the third length is equal to the first length.

3. The thrust reverser of claim 1, wherein the post-exit portion of the hybrid exhaust duct defines an angular section having an origin positioned on the central axis and wherein the angular section defines an arc within a range from one-hundred-twenty degrees (120°) to sixty degrees (60°).

4. The thrust reverser of claim 3, wherein the second length is greater than or equal to eighty percent (80%) and less than or equal to ninety percent (90%) of the first length.

5. The thrust reverser of claim 1, wherein the first reverser door is pivotally mounted to the frame on a first hinge line, wherein the second reverser door is pivotally mounted to the frame on a second hinge line and wherein the first hinge line is located aft of the second hinge line.

6. The thrust reverser of claim 5, wherein the first hinge line is oriented substantially perpendicular to the central axis and spaced a first offset distance from the central axis, wherein the second hinge line is oriented substantially perpendicular to the central axis and spaced a second offset distance from the central axis and wherein the first offset distance is less than or equal to the second offset distance.

7. The thrust reverser of claim 6, wherein the first offset distance is greater than or equal to 5% and less than or equal to 15% of the first length and wherein the second offset distance is greater than or equal to 5% and less than or equal to 15% of the first length.

8. A hybrid thrust reverser, comprising:
a frame;
a pair of opposing side beams;
a first reverser door pivotally mounted to the frame and having a first trailing edge;
a second reverser door pivotally mounted to the frame and having a second trailing edge;
an attachment flange connected to the frame; and
a hybrid exhaust duct,
wherein the first trailing edge provides a portion of an exit plane of the hybrid thrust reverser and the second trailing edge provides a transition portion that merges into the hybrid exhaust duct,
wherein the hybrid thrust reverser defines a central axis and the hybrid exhaust duct includes a pre-exit portion extending circumferentially about the central axis from a first termination point to a second termination point, wherein the first termination point and the second termination point define a post-exit portion of the hybrid exhaust duct and the first reverser door includes a first outer surface having a first outer surface portion configured to reside in the post-exit portion when the hybrid thrust reverser assumes a stowed position, and wherein the first outer surface defines a first length from the attachment flange to the exit plane, the second reverser door includes a second outer surface that defines a second length from the attachment flange to the pre-exit portion of the hybrid exhaust duct and the first length is greater than the second length.

9. The hybrid thrust reverser of claim 8, wherein the post-exit portion of the hybrid thrust reverser includes an open portion defined by an angular section having an origin positioned on the central axis and wherein the angular section defines an arc within a range from one-hundred-twenty degrees (120°) to sixty degrees (60°).

10. The hybrid thrust reverser of claim 9, wherein the pre-exit portion of the hybrid exhaust duct includes a circumferential portion of the hybrid exhaust duct that merges with the second reverser door when the hybrid thrust reverser assumes the stowed position.

11. The hybrid thrust reverser of claim 10, wherein the first reverser door is pivotally mounted to the frame on a first hinge line, wherein the second reverser door is pivotally mounted to the frame on a second hinge line and wherein the first hinge line is located aft of the second hinge line.

12. The hybrid thrust reverser of claim 11, wherein the first hinge line is oriented substantially perpendicular to the central axis and spaced a first offset distance from the central axis, wherein the second hinge line is oriented substantially perpendicular to the central axis and spaced a second offset distance from the central axis and wherein the first offset distance is less than or equal to the second offset distance.

13. A thrust reverser, comprising:
a pair of opposing side beams;
an upper reverser door pivotally mounted to the pair of opposing side beams and having an upper trailing edge;
a lower reverser door pivotally mounted to the pair of opposing side beams and having a lower trailing edge; and
a hybrid exhaust duct,
wherein the upper trailing edge provides a portion of an exit plane of the thrust reverser and the lower trailing edge provides a transition portion that merges into the hybrid exhaust duct,
wherein the hybrid exhaust duct includes a pre-exit portion that extends circumferentially, about a central axis extending through the thrust reverser, from a first termination point to a second termination point,
wherein the first termination point and the second termination point define a post-exit portion of the hybrid exhaust duct and the upper reverser door includes a first outer surface having a first outer surface portion configured to reside in the post-exit portion when the thrust reverser assumes a stowed position, and
wherein the first outer surface defines a first length from an attachment flange to the exit plane, the lower reverser door includes a second outer surface that defines a second length from the attachment flange to the pre-exit portion of the hybrid exhaust duct and the first length is greater than the second length.

14. The thrust reverser of claim 13, wherein the upper reverser door is pivotally mounted to the pair of opposing side beams on a first hinge line, wherein the lower reverser door is pivotally mounted to the pair of opposing side beams on a second hinge line and wherein the first hinge line is located aft of the second hinge line.

15. The thrust reverser of claim 14, wherein the first hinge line is oriented substantially perpendicular to the central axis and spaced a first offset distance from the central axis, wherein the second hinge line is oriented substantially perpendicular to the central axis and spaced a second offset distance from the central axis and wherein the first offset distance is equal to the second offset distance.

* * * * *